(12) United States Patent
Cvijetic et al.

(10) Patent No.: US 9,131,289 B2
(45) Date of Patent: Sep. 8, 2015

(54) SOFTWARE-DEFINED OPTICAL NETWORK

(71) Applicant: NEC Laboratories America, Inc., Princeton, NJ (US)

(72) Inventors: Neda Cvijetic, Plainsboro, NJ (US); Maria Ioanna Angelou, Agia Paraskevi (GR); Ankitkumar Patel, Monmouth Junction, NJ (US); Milorad Cvijetic, Tucson, AZ (US); Philip Nan Ji, Plainsboro, NJ (US); Ting Wang, West Windsor, NJ (US)

(73) Assignee: NEC Laboratores America, Inc., Princeton, NJ (US)

( * ) Notice: Subject to any disclaimer, the term of this patent is extended or adjusted under 35 U.S.C. 154(b) by 303 days.

(21) Appl. No.: 13/915,874

(22) Filed: Jun. 12, 2013

(65) Prior Publication Data

US 2013/0343755 A1    Dec. 26, 2013

Related U.S. Application Data

(60) Provisional application No. 61/662,627, filed on Jun. 21, 2012.

(51) Int. Cl.
| | |
|---|---|
| *H04J 14/00* | (2006.01) |
| *H04B 10/20* | (2006.01) |
| *H04Q 11/00* | (2006.01) |
| *H04J 14/02* | (2006.01) |

(52) U.S. Cl.
CPC ........ *H04Q 11/0066* (2013.01); *H04J 14/0227* (2013.01); *H04J 14/0282* (2013.01)

(58) Field of Classification Search
CPC .......... H04Q 11/0066; H04Q 14/0282; H04Q 14/0227
USPC ................................................ 398/45, 58–73
See application file for complete search history.

(56) References Cited

U.S. PATENT DOCUMENTS

| | | | | |
|---|---|---|---|---|
| 6,697,374 | B1 * | 2/2004 | Shraga et al. | 370/458 |
| 7,978,975 | B2 * | 7/2011 | Qian et al. | 398/69 |
| 8,433,069 | B2 * | 4/2013 | Noda | 380/260 |
| 2004/0264961 | A1 * | 12/2004 | Nam et al. | 398/58 |

(Continued)

OTHER PUBLICATIONS

Shaw et all , Hybrid Architecture and Integrated Routing in a Scalable Optical Wireless Access Network , Nov. 2007, LTJ vol. 25 issue 11, pp. 3443-3451.*

(Continued)

*Primary Examiner* — Ken Vanderpuye
*Assistant Examiner* — Dibson Sanchez
(74) *Attorney, Agent, or Firm* — Joseph Kolodka

(57) ABSTRACT

A software-defined (SD) optical network is disclosed. An SD optical line terminal (OLT) includes a global SD controller, one or more SD OLT drivers connected to the global SD controller, and an underlying hardware component connected to each of said one or more SD OLT drivers. An SD optical network unit (ONU) includes a local SD controller, one or more SD optical network unit (ONU) drivers connected to the local SD controller, and an underlying hardware component connected to each of said one or more SD ONU drivers, wherein the local SD controller manages said one or more SD ONU drivers by issuing commands communicated to said one or more SD ONU drivers, and wherein each of said one or more SD ONU drivers implements a required function on the underlying hardware component. Other apparatuses, systems, and methods also are disclosed.

4 Claims, 13 Drawing Sheets

(56) References Cited

U.S. PATENT DOCUMENTS

| | | | |
|---|---|---|---|
| 2006/0228113 A1* | 10/2006 | Cutillo et al. | 398/71 |
| 2008/0019689 A1* | 1/2008 | Brooks et al. | 398/17 |
| 2008/0267630 A1* | 10/2008 | Qian et al. | 398/89 |
| 2009/0024725 A1* | 1/2009 | Bernard et al. | 709/223 |
| 2009/0097852 A1* | 4/2009 | Qian et al. | 398/89 |
| 2009/0142059 A1* | 6/2009 | Chen et al. | 398/58 |
| 2010/0150546 A1* | 6/2010 | Shrikhande et al. | 398/10 |
| 2010/0196006 A1* | 8/2010 | Lin et al. | 398/58 |
| 2010/0215368 A1* | 8/2010 | Qian et al. | 398/67 |
| 2010/0239256 A1* | 9/2010 | Zheng | 398/66 |
| 2011/0033187 A1* | 2/2011 | Rossetti et al. | 398/79 |
| 2011/0035522 A1 | 2/2011 | Tan et al. | |
| 2012/0121252 A1 | 5/2012 | Kim et al. | |
| 2013/0045012 A1* | 2/2013 | Kanonakis et al. | 398/66 |
| 2013/0089336 A1* | 4/2013 | Dahlfort et al. | 398/115 |
| 2013/0239165 A1* | 9/2013 | Garavaglia et al. | 725/129 |
| 2015/0207587 A1* | 7/2015 | Laraqui et al. | 398/68 |

OTHER PUBLICATIONS

Das et al, Unifying Packet and Circuit Switched Networks with OpenFlow, Dec. 2009, Stanford University, pp. 1-9.*

McKeown, Software defined Networking, Apr. 2009, Infocom, All Doucument.*

N. Cvijetic, A. Tanaka, Y.K. Huang, M. Cvijetic, E. Ip, Y. Shao, T. Wang, "4+G mobile backhaul over OFDMA/TDMA-PON to 200 cell sites per fiber with 10Gb/s upstream burst-mode operation enabling <1ms transmission latency," Proc. OFC 2012, paper PDPD5B.7.

N. McKeown, T. Anderson, H. Balakrishnan, G. Parulkar, L. Peterson, J. Rexford, S. Shenker, J. Turner, "OpenFlow: enabling innovation in campus networks," OpenFlow white paper, Mar. 2008, available at http://www.openflow.org/documents/openflow-wp-latest.pdf.

K. Kanonakis, N. Cvijetic, I. Tomkos, T. Wang, "A Novel Energy and Delay Efficient OFDMA "Meta-MAC" Scheme for Heterogeneous PON Coexistence," Proc. OECC 2012, paper 4A4-5, Jun. 2012.

P. Chanclou, A. Cui, F. Geilhardt, H. Nakamura, D. Nesset, "Network operator requirements for the next generation of optical access networks", IEEE Netw. Mag., vol. 26, No. 2, pp. 8-14, Mar.-Apr. 2012.

K. Y. Lau, "RF transport over optical fiber in urban wireless infrastructures," J. Opt. Commun. Netw., vol. 4, No. 4, Apr. 2012.

T. Pfeiffer, F. Schaich, "Optical architectures for mobile back- and fronthauling," presented at 2012 Opt. Fiber Commun. Conf. (OFC), Mar. 2012.

OpenFlow specification, http://www.openflow.org/.

Common public radio interface (CPRI) specification, http://www.cpri.info/spec.html.

* cited by examiner

SOFTWARE-DEFINED OPTICAL NETWORK

This application claims the benefit of U.S. Provisional Application No. 61/662,627, entitled "Software-Defined Heterogeneous 100 Gb/s Mobile Backhaul with 1000+ per-Fiber Cell Counts," filed on Jun. 21, 2012, the contents of which are incorporated herein by reference.

BACKGROUND OF THE INVENTION

The present invention relates to a software-defined optical network and, more particularly, to a software-defined (SD) optical line terminal (OLT) and a software-defined (SD) optical network unit (ONU).

As both architecture and service heterogeneity continues to increase in optical networks, software-defined optics—i.e. on-demand optical hardware re-configurability via software—is becoming an increasingly important tool for managing network complexity and increasing cost-efficiency. This is particularly important in optical access/metro/backhaul networks, where operators increasingly desire to have a "wholesale network" for heterogeneous services, rather than a set of disparate, application-specific platforms. However, in current architectures, both centralized management units and remote end-user transceivers are designed and implemented in a service-specific way. Consequently, leveraging the same expensive fiber access infrastructure for residential, business and mobile backhaul services becomes quite difficult because of both hardware and management (i.e. quality-of-service, latency, etc.) specificity. Moreover, convergence of different types of mobile backhaul services and protocols (e.g. generic digital radio-over-fiber signaling versus Internet Protocol (IP)-based packet transport) onto a single optical infrastructure likewise becomes complex due to differences in optical transceiver structures and capabilities. Software-defined upgrades of both optical transceivers and software-based management/control units is thus an important way to enable cost-efficient hardware re-configurability and, ultimately, heterogeneous service convergence in optical access/metro/backhaul networks.

In previous work, new software-defined optical network element control protocols, such as OpenFlow, for example, have been proposed in the context of core optical networks. In this environment, the goal of such software-defined control is to abstract hardware-related differences between different vendors in a single network, enabling interoperability, centralized management and control, which can both enable rapid introduction of new services and enhance cost-efficiency. Software-defined optical transceiver functionality has also been explored in long-haul core optical networks, as a way to customize physical transceiver parameters (e.g. modulation format, spectral band size, forward error correction coding rate, etc.) in a way that optimizes the performance of each individual point-to-point link. Similar principles have also been proposed and exploited in software-defined radio systems, in which physical transceiver parameters (e.g. spectral occupancy, transmitter power, etc.) can be modified to optimize use of expensive radio frequency (RF) spectrum subject to multiuser interference constraints, for example. However, in all of these cases, heterogeneous service delivery is not a primary target, the underlying physical hardware is designed to have largely fixed functionality and a relatively small set of software-configurable options. Consequently, while operational and control parameters can be tweaked in software, significant physical and higher layer differences cannot be overcome such that the same software-defined optical transceiver and management structure could be used for disparate applications.

We treat the optical transceiver as a "smart phone" and heterogeneous services (e.g. residential, business, various mobile backhaul scenarios) as software-defined applications that can all run on the optical transceiver platform in a software-configurable way. In other words, an optical transceiver design is presented that includes the necessary hardware functionality to execute physical and higher layer requirements for different services, while a software-defined management approach is introduced to decide which of those hardware function blocks will be activated to execute a target function. In other words, each optical transceiver becomes a local software-defined network, where each hardware block is treated as a network element that is locally controlled in software, but in a centralized fashion. The operations and instructions for the local software controller are in turn issued by a global software-based controller (e.g. in the central office or optical line terminal of the access/metro/mobile backhaul (MBH) network.) Specifically, while the global software-defined controller is responsible for deciding what the remote software-defined transceiver should do, the local software-defined controller has the task to decide how this will be done by local control (i.e. enabling, disabling, scheduling, setting operational parameters, etc.) of the hardware elements in the optical transceiver.

The proposed solution strikes an attractive balance between centralization and distribution of processing functionality in a way that enables convergence of heterogeneous services onto a single optical "wholesale" network. For example, by centralizing global control, management and application specificity but distributing physical-layer intelligence, a single set of smart, software-defined optical transceivers can be used for residential, business, MBH, special purpose, etc., services, and software-configured on-demand a posteriori to implement a specific function. In this way, the mass market volumes and cost-efficiency of digital signal processing (DSP)-based network/transceiver upgrades can be used to both reduce network complexity and cost.

REFERENCES

[1] N. Cvijetic, A. Tanaka, Y. K. Huang, M. Cvijetic, E. Ip, Y. Shao, T. Wang, "4+G mobile backhaul over OFDMA/TDMA-PON to 200 cell sites per fiber with 10 Gb/s upstream burst-mode operation enabling <1 ms transmission latency," Proc. OFC 2012, paper PDP5B.7.

[2] N. McKeown, T. Anderson, H. Balakrishnan, G. Parulkar, L. Peterson, J. Rexford, S. Shenker, J. Turner, "OpenFlow: enabling innovation in campus networks," OpenFlow white paper, March 2008, available at http://www.openflow.org/documents/openflow-wp-latest.pdf.

[3] K. Kanonakis, N. Cvijetic, I. Tomkos, T. Wang, "A Novel Energy and Delay Efficient OFDMA "Meta-MAC" Scheme for Heterogeneous PON Coexistence," Proc. OECC 2012, paper 4A4-5, June 2012.

[4] P. Chanclou, A. Cui, F. Geilhardt, H. Nakamura, D. Nesset, "Network operator requirements for the next generation of optical access networks", *IEEE Netw. Mag.*, vol. 26, no. 2, pp. 8-14, March-April 2012.

[5] K. Y. Lau, "RF transport over optical fiber in urban wireless infrastructures," *J. Opt. Commun. Netw.*, vol. 4, no. 4, April 2012.

[6] T. Pfeiffer, F. Schaich, "Optical architectures for mobile back- and fronthauling," presented at 2012 Opt. Fiber Commun. Conf. (OFC), March 2012.

[7] OpenFlow specification, http://www.openflow.org/.
[8] Common public radio interface (CPRI) specification, http://www.cpri.info/spec.html.

BRIEF SUMMARY OF THE INVENTION

An objective of the present invention is to achieve balance between centralization and distribution of processing functionality in a way that enables convergence of heterogeneous services onto a single optical network.

An aspect of the present invention includes a software-defined (SD) optical line terminal (OLT). The SD OLT includes a global software-defined (SD) controller, one or more software-defined (SD) optical line terminal (OLT) drivers connected to the global SD controller, and an underlying hardware component connected to each of said one or more SD OLT drivers, wherein the global SD controller manages said one or more SD OLT drivers by issuing commands communicated to said one or more SD OLT drivers, and wherein each of said one or more SD OLT drivers implements a required function on the underlying hardware component. Another aspect of the present invention includes a software-defined (SD) optical network unit (ONU). The SD ONU includes a local software-defined (SD) controller, one or more software-defined (SD) optical network unit (ONU) drivers connected to the local SD controller, and an underlying hardware component connected to each of said one or more SD ONU drivers, wherein the local SD controller manages said one or more SD ONU drivers by issuing commands communicated to said one or more SD ONU drivers, and wherein each of said one or more SD ONU drivers implements a required function on the underlying hardware component.

Still another aspect of the present invention includes a communications method implemented in a software-defined (SD) optical network having a software-defined (SD) optical line terminal (OLT) including a global software-defined (SD) controller and one or more software-defined (SD) optical line terminal (OLT) drivers and a software-defined (SD) optical network unit (ONU) including a local software-defined (SD) controller and one or more software-defined (SD) optical network unit (ONU) drivers. The communications method includes managing said one or more SD OLT drivers and said one or more SD ONU drivers by issuing commands communicated to said one or more SD OLT drivers and said one or more SD ONU drivers, and implementing a required function on an underlying hardware component connected to each of said one or more SD OLT drivers and said one or more SD ONU drivers.

DETAILED DESCRIPTION

Figure 1:
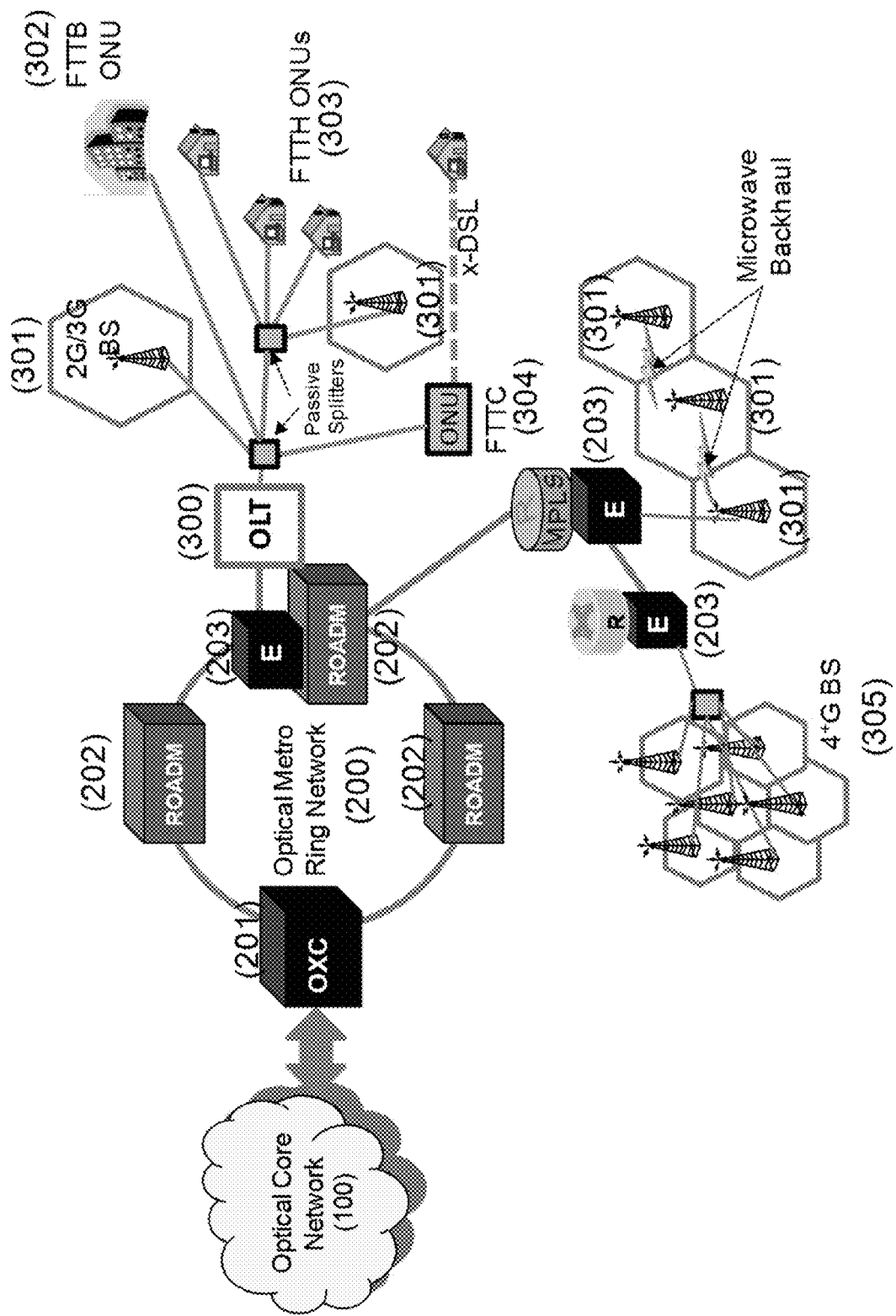
FIG. 1 depicts an optical network platform for heterogeneous service support; OXC=optical crossconnect; ROADM=reconfigurable optical add/drop multiplexer; E=Ethernet switch; OLT=optical line terminal; BS=base station; FTT(B/C/H)=fiber to the business/curb/home; DSL=digital subscriber line; ONU=optical network unit.

To illustrate the context of the proposed approach and highlight its features, the architecture of an optical network for residential access, business, and mobile backhaul services is shown in FIG. 1. As shown in FIG. 1, traffic from the optical core network 100 first traverses the optical ring metro network 200 through a series of optical routing and switching elements (e.g. 201, 202, and 203). In the final segment of the network, the existence of several different types of remote optical network units (ONUs), e.g. 301 to 305, is mandated by the need to deliver different types of services using ONU hardware that is service-specific. Moreover, even within the context of a single general application—$4^+$G mobile backhaul, for example, which may range from small cell/IP backhaul to generic digital radio-over-fiber signaling—different transceivers may be even required for different $4^+$G BS sites 305. Finally, as shown in FIG. 1, different applications currently exist on different fiber-optic platforms and architectures, which complicates network management and limits scalability and service convergence.

Figure 2:
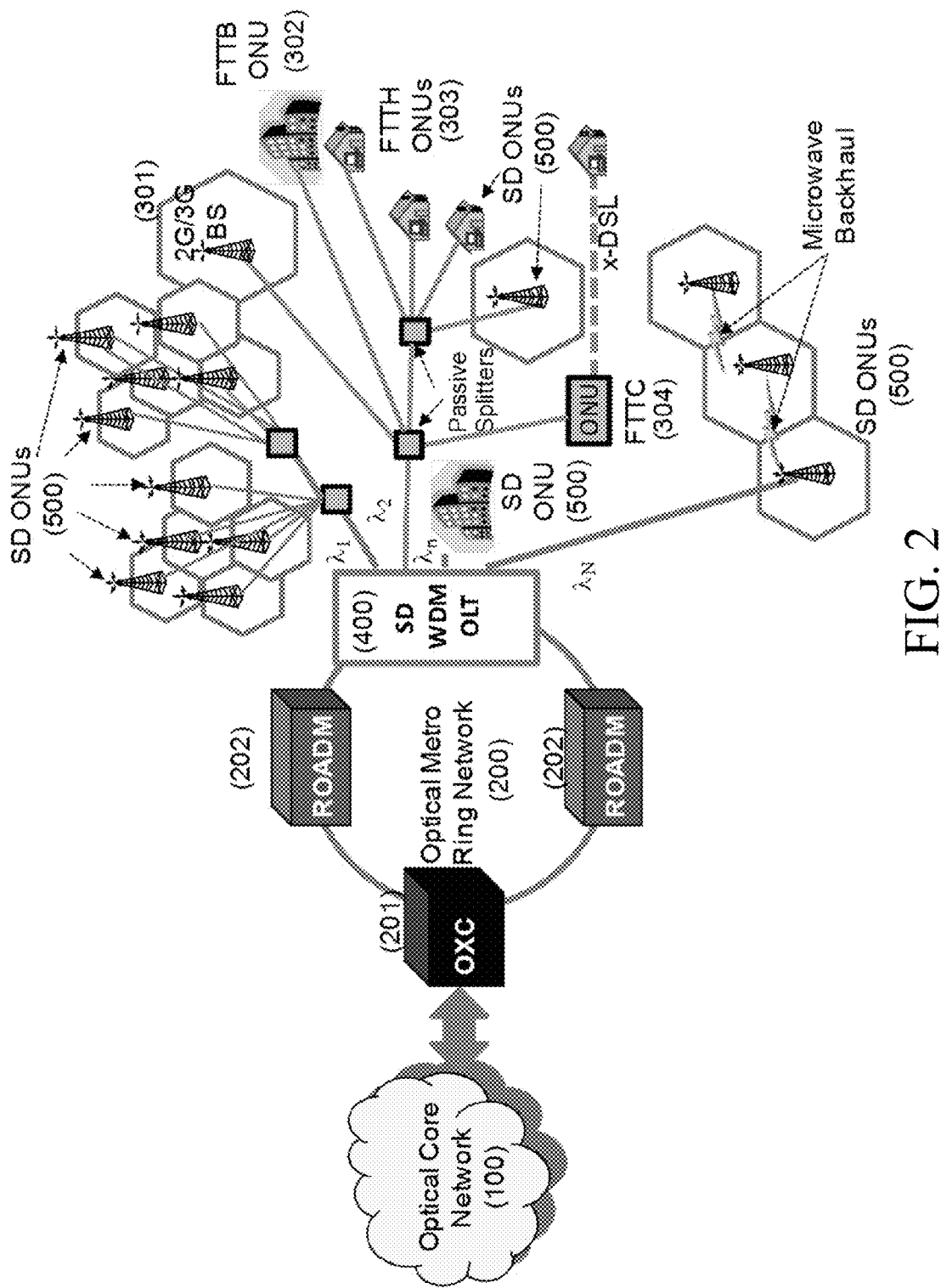
FIG. 2 depicts a proposed software-defined optical network for heterogeneous service convergence; SD=software-defined; SD WDM OLT=software-defined wavelength division multiplexed optical line terminal.

To overcome the limitations of the architecture in FIG. 1, the proposed software-defined optical network for converged metro/access/backhaul services is shown in FIG. 2. In this case, optical metro ring network routing/switching hardware that interfaces with the end-user network segment, e.g. 202 and 203 in FIG. 1, is replaced by SD WDM OLT 400. SD WDM OLT 400 takes on the role of a centralized reconfigurable network controller, which abstracts application specificity and simplifies network management. SD WDM OLT 400 thus performs all complex control and scheduling functions needed to meet specific application requirements. Due to the centralized SD control approach in SD WDM OLT 400, network resource virtualization and sharing is also enabled. Moreover, by combining centralized software-defined control with wavelength division multiplexing (WDM), SD WDM OLT 400 can perform service-dependent wavelength assignment and management on a need basis and in a way that does not disrupt services by exploiting the enhanced functionality of proposed SD ONU transceivers 500. An idea behind the operation of SD ONUs 500 is that they have the inbuilt hardware capability to support a number of potential applications, such as different flavors of emerging mobile backhaul services, special purpose/enterprise/datacenter traffic flows, and/or residential access. Which of those functions SD ONU 500 ends up assuming is decided by the software-defined control on-board the SD ONU transceiver itself. Consequently, SD ONU 500 can be regarded as a smart device with the hardware capability and sufficient distributed intelligence to run/support different applications on a need basis, and in a reconfigurable fashion. Since the enhanced functionality of proposed SD ONUs 500 is largely in the digital domain, and both residential and mobile BS markets operate in mass volumes, the ability to share a common transceiver set for heterogeneous services and still operate over a fiber distribution network can be important for notably improving cost-efficiency and enabling rapid introduction of new network applications.

Figure 3:
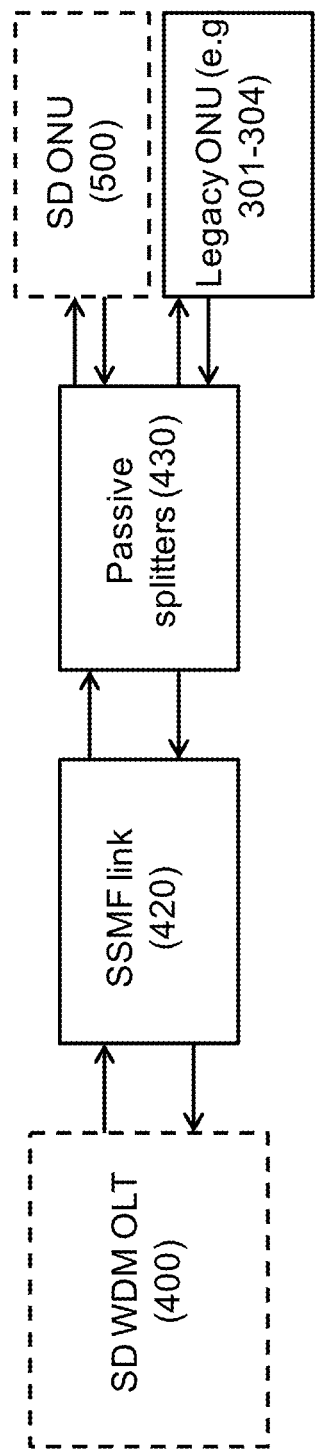
FIG. 3 depicts a high-level block diagram for the proposed software-defined converged optical network architecture.

FIG. 3 illustrates a proposed architecture. As shown in FIG. 3, the architecture comprises SD WDM OLT 400 and SD ONU 500 architectures, while the remaining network elements, such as standard single mode fiber (SSMF) links 420 and passive splitters 430, contribute to cost-efficiency.

Figure 4:
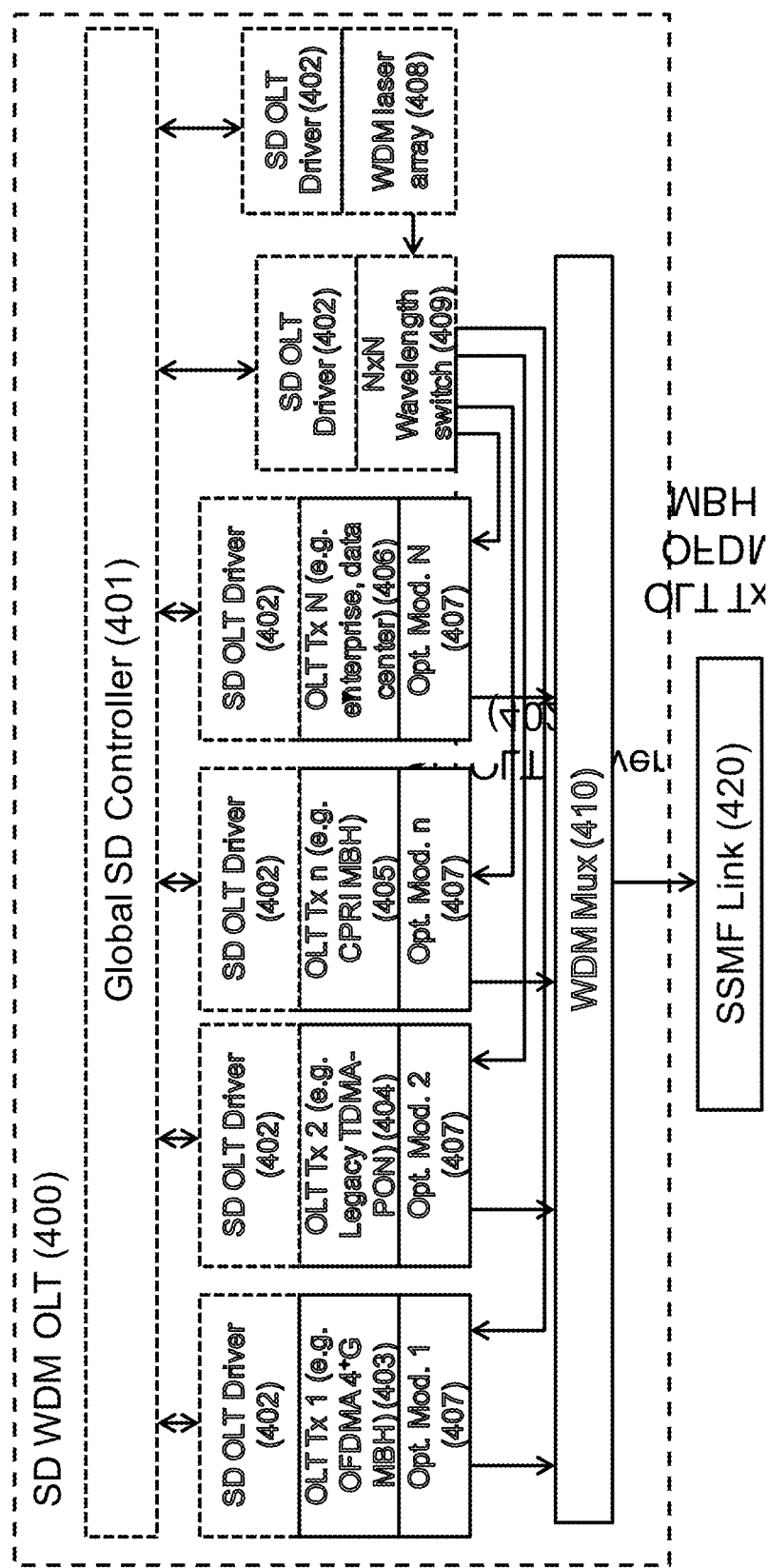
FIG. 4 depicts a detailed operational block diagram of software-defined WDM OLT 400. SD=software-defined; Tx=transmitter; Opt. Mod.=optical modulator.

FIG. 4 illustrates the detailed operational principles of SD WDM OLT 400, which contains a number of optics and electronics modules that are centrally managed by global SD controller 401. In this way, SD WDM OLT 400 can be regarded as a software-defined network that exists in a single physical location. Global SD controller 401 can feature different levels of functionality, from providing a generic software-defined interface between the control and data planes (e.g. OpenFlow [2]), to performing complex resource scheduling and management tasks for the set of heterogeneous systems it supports (e.g. "meta-MAC" in [3]). The commands issued by global SD controller 401 are communicated to SD OLT drivers 402, which also implement the required functions on each underlying hardware component. In this way, heterogeneity between different services/applications is abstracted such that different OLT transmitters, e.g. 403 to 406 in FIG. 4, can all co-exist in SD WDM OLT 400 in their native forms. In FIG. 4, the co-existence of N such native services is shown, without loss of generality. The electrical signal output from each of OLT transmitters 403 to 406 is then applied to separate optical modulator 407, such that the modulated optical signal can operate on any one of possible N wavelengths. As shown in FIG. 4, this wavelength tunability is also achieved in a software-defined fashion—specifically, wavelength management and assignment performed by global SD controller 401 are first communicated via SD OLT drivers 402 to WDM laser array module 408 and N×N wavelength switch 409. Software-defined control of WDM laser array 408 can thus ensure wavelength stability and laser frequency tunability, while the use of N×N wavelength switch 409 enables a given wavelength input to appear at an arbitrary output port. In this way, wavelength assignment can be done in a scalable, flexible way. Finally, the modulated optical outputs from 407 are combined using WDM multiplexer 410 and transmitted over SSMF link 420.

Figure 5:
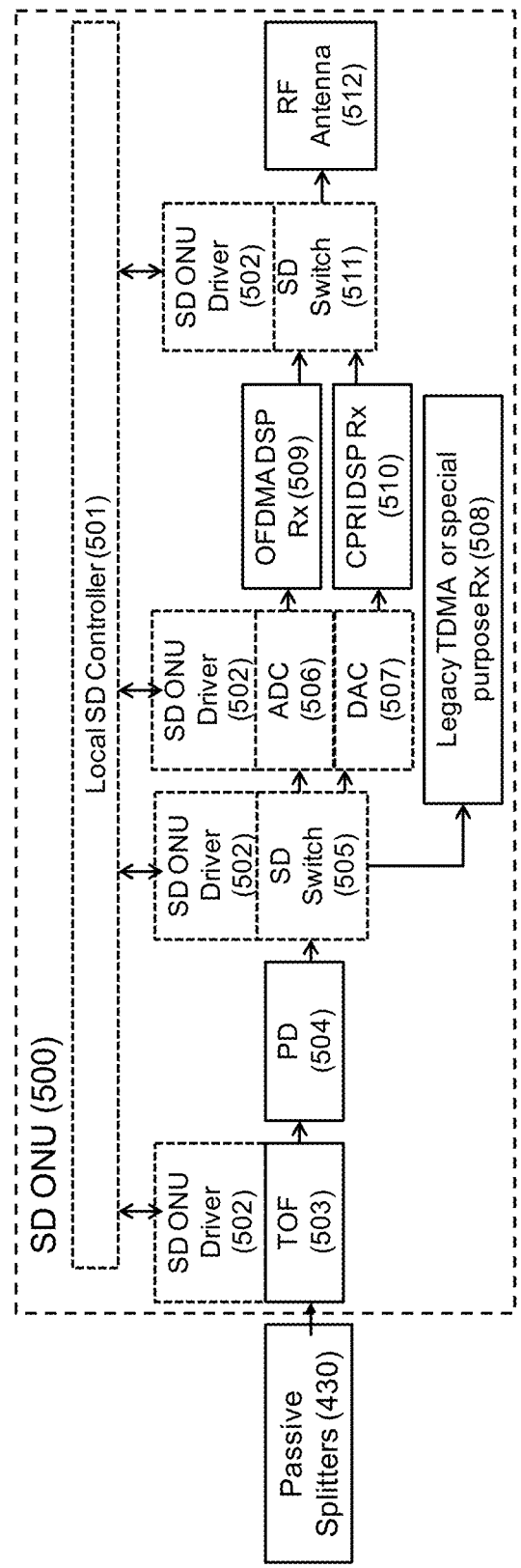
FIG. 5 depicts a detailed operational block diagram of the software-defined ONU 500. SD=software-defined; ONU=optical network unit; TOF=tunable optical filter; PD=photodiode; ADC=analog-to-digital converter; DAC=digital-to-analog converter; DSP=digital signal processor; Rx=receiver; CPRI=common public radio interface; RF=radio frequency.

FIG. 5 illustrates the detailed operational principles of SD ONU 500, which also contains a number of optics and electronics modules that are centrally managed by local ONU-side SD controller 501. Consequently, SD ONU 500 can also be regarded as a software-defined network that exists in a single physical location. However, unlike global SD controller 401, local SD controller 501 does not perform complex resource management, but rather is responsible for locally managing and executing commands defined by global SD controller 401. To do so, local SD controller 501 communicates with SD ONU drivers 502 through a generic interface (e.g. OpenFlow), to configure the underlying software-configurable optics and electronics hardware set in accordance with the service and resource management targets set by global SD controller 401. First, depending on the wavelength assignment decision from 401, the wavelength passband of TOF 503 is selected by local SD controller 501 and executed by the SD ONU driver 502. Following photodetection of the incoming optical signal by PD 504, the resulting electronic signal can take one of several possible paths, depending on the type of service that SD ONU 500 is configured to support. This information is communicated from local SD controller 501 to SD ONU driver 502 that configures SD switch 505 to select one of several possible output paths. In the architecture of FIG. 5, in the case of orthogonal frequency division multiple access (OFDMA)-based mobile backhaul, for example, the electronic signal from 505 would become input to ADC 506, followed by OFDMA DSP Rx 509, before being passed to RF antenna 512 by second software-defined switch 511. To enable digital radio-over-fiber operation, on the other hand, SD switch 505 would pass PD 504 output signal to DAC 507, while the DAC output would be processed by CPRI DSP Rx 510 before being routed to RF antenna 512 by second SD switch 511. Finally, special purpose applications could also be supported by SD ONU 500 by configuring SD switch 505 at the PD output to terminate the electronic signal at designated special purpose Rx 508. It is also noted that additional output paths can be added to SD switch 505 output without loss of generality. Moreover, SD ONU drivers 402 could also be implemented either on a different sub-set of optics and/or electronics modules, or on the full set of underlying hardware modules, depending on the target set of SD ONU (500) applications.

Software-defined optical transceiver modules in the OLT and the ONUs are denoted by 400 and 500 respectively in FIGS. 3-5. Specifically, in SD WDM OLT module 400 in FIG. 4, the solutions include the use of global SD controller 401 to centrally manage the major hardware blocks of the SD WDM OLT transceiver of FIG. 4 as though the transceiver itself were a localized network. This feature is achieved by SD OLT drivers 402 installed on the major electronic and optical hardware blocks of the SD WDM OLT (i.e. 403 to 407), which enables both software-reconfigurable operation as well as heterogeneous service coexistence by appropriate physical-layer abstraction. Finally, 401 and 402 are applied to the WDM laser array and wavelength switch of 408 and 409 in FIG. 4, and software-defined wavelength transparency can be achieved to aggregate different optical access/backhaul/special purpose services onto a single platform. Likewise, in SD ONU 500, the solution includes the use of local SD controller 501, SD ONU drivers 502, and SD switches 505 and 511 to centrally-manage the optical and electronic hardware modules as though they were elements in a local software-defined network, and in this way turn them on/off and operate them in a software-reconfigurable, application-specific way. For example, by selecting 504, 505, 506, 509, and 511 as the input/output signal path through the SD ONU local network, SD local controller 501 and SD drivers 502 will operate the SD ONU as a OFDMA-based mobile backhaul transceiver. By selecting 504, 505, 507, 510, and 511 as input/output signal path through the SD ONU local network, SD local controller 501 and SD drivers 502 will operate the SD ONU as a CPRI-based transceiver, on the other hand. In this way, software-reconfigurable operation for heterogeneous types of optical backhaul traffic is achieved with the same underlying optical hardware transceiver. Finally, by terminating the input signal at 508, service support can also be enabled in a software-defined way by 501 and 502. It is also noted that this same general principle can be extended to other services, without loss of generality. Finally, local SD controller 501 and SD driver 502 are also used to enable input signal wavelength selection by software-reconfigurable control of tunable optical filter 503, as shown in FIG. 5.

Function blocks 400 and 500 are enabled by function sub-blocks 401, 402, 408, 409, 501, 502, 505 to 507, and 511, as shown in FIGS. 3-5. As described above, these features jointly enable a software-defined optical transceiver architecture at both the OLT and the ONUs, wherein the optical transceivers are treated as localized networks of software-reconfigurable hardware-elements. In this way, the same underlying transceiver hardware can be used to accommodate heterogeneous services, including optical backhaul, residential, and special purpose (e.g. enterprise, datacenter, etc.) applications. To converging different services onto a single fiber-optic platform and exploiting the mass market volumes and cost-efficiency of digital signal processing (DSP)-based network/transceiver upgrades, flexible operation, rapid introduction of novel services/applications, and significant network cost and complexity reductions can be achieved.

Appendix: Further System Details

We present the first software-defined optical architecture for heterogeneous mobile backhaul, featuring generic, software-reconfigurable OLT/ONU transceivers capable of operating in different MBH modes. Throughput/delay benefits, 100 Gb/s rates, and support for 1024 ONUs per-fiber are confirmed.

I. INTRODUCTION

The advent of 4G mobile technologies is creating large incentives to leverage fiber-optic access infrastructure for mobile backhaul (MBH) [1, 4, 5]. A major challenge in this regard is the heterogeneity of 4$^+$G MBH scenarios, which can have conflicting system and component level requirements, and complicate MBH convergence onto a single fiber-optic platform. For example, for broadcast-type distributed antenna systems (DAS) or low density 2 G/3 G backhaul, fully-centralized processing can enable simple, low-maintenance remote hardware, as well as centralized resource sharing and virtualization for cloud radio access network (CRAN) concepts [5]. However, in this case, end-to-end optical backhaul of digital I/Q samples (in the form of CPRI over TDM-based PON [6], for example), can require order(s)-of-magnitude bandwidth overhead, prevent electronic-domain statistical multiplexing, and consume much of the strict latency budget on round-trip control messaging rather than data processing. With distributed processing at remote cell sites, on the other hand, such as in OFDMA-based MBH [1], native data rates beyond 10 Gb/s/λ, statistical multiplexing (e.g. via Ethernet/IP), and reduced latency/jitter can be exploited, which can be especially useful for emerging scenarios such as high-density small-cell MBH. Moreover, despite these differences, both MBH types may be required in future networks, such that flexible, cost-efficient coexistence is desirable.

In this Appendix, we present the first software-defined (SD) approach for heterogeneous MBH, based on generic, software-reconfigurable OLT/ONU transceivers that can operate in different MBH modes (e.g. CPRI vs. OFDMA MBH), as needed. Throughput and delay benefits of the SD approach over fixed XG-PON backhaul are validated via real-time traffic simulations, while 100 Gb/s data rates with 1024 per-fiber cell counts are experimentally verified through a tunable WDM-OFDMA-PON setup, with WDM tunability enabled by tunable optical filters as proposed for next-generation hybrid TDM/WDM-PON. The SD approach is thus attractive for high performance heterogeneous MBH over a single wholesale optical backhaul network.

II. PROPOSED SD MBH ARCHITECTURE AND REAL-TIME TRAFFIC EVALUATION

Figure 6A:
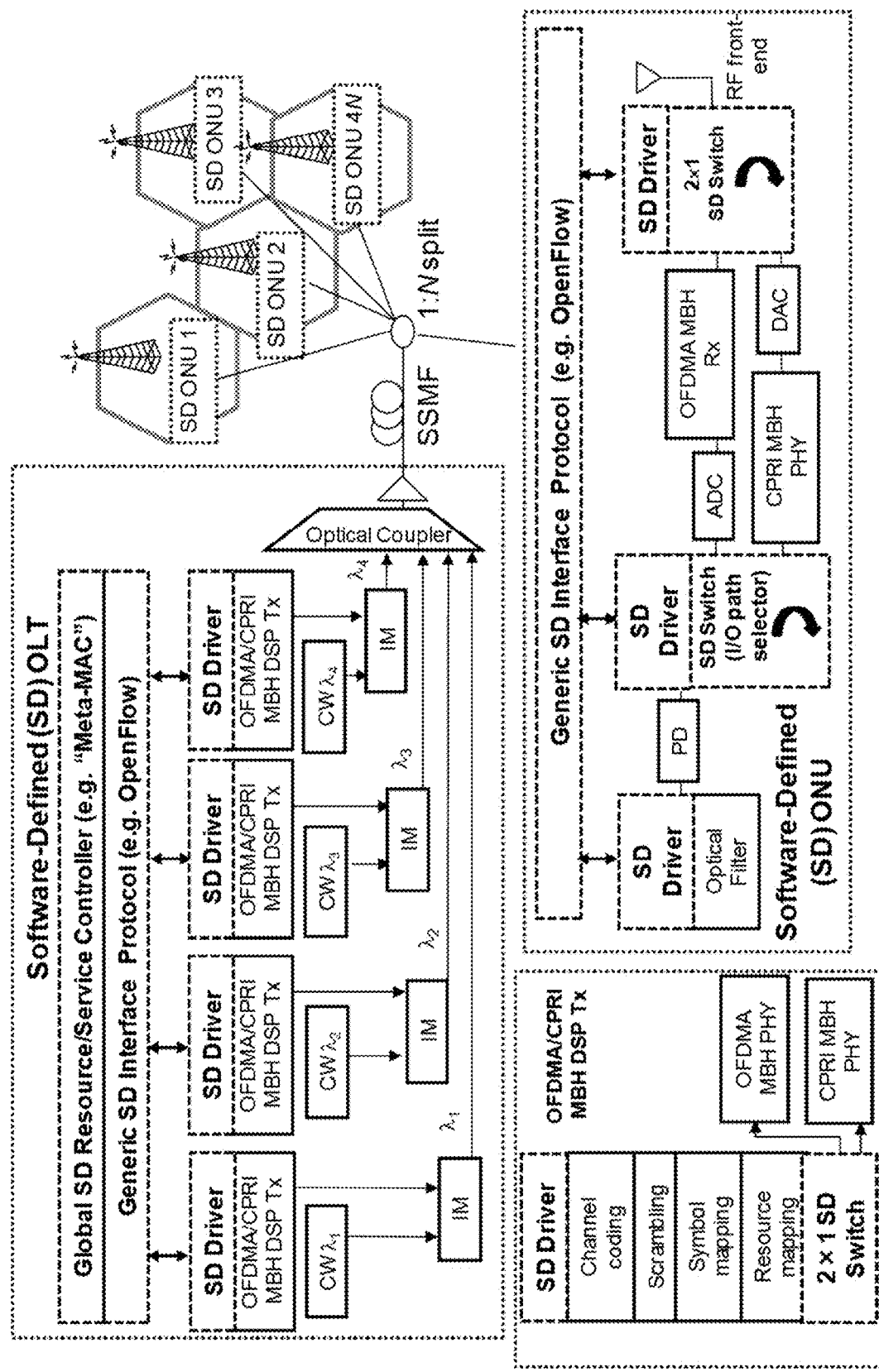
FIG. 6(a) depicts a proposed SD heterogeneous MBH architecture with real-time traffic simulation

FIG. 6 shows the proposed SD MBH architecture, wherein the SD OLT and ONUs become local software-defined networks, composed of optical and electronic hardware elements that are controlled centrally via software. At the SD OLT, a global SD resource/service control algorithm (such as the "Meta-MAC" [3], for example), executes dynamic bandwidth allocation and MBH service type assignment for each OLT Tx interface. The resulting decisions are communicated to the Tx interfaces using a generic SD protocol, such as OpenFlow [7]. Depending on its MBH type (OFDMA vs. CPRI), the SD driver of each DSP Tx selects the corresponding set of required physical-layer functions to be executed by the DSP Tx (FIG. 6(a)). To enable beyond 1000 per-fiber ONU counts with low wavelength plan complexity, four CW lasers with wavelengths $\lambda_1$-$\lambda_4$, are used for optical intensity modulation (IM) of the heterogeneous MBH signals. A 4×1 optical coupler is used to combine the signals on $\lambda_1$-$\lambda_4$, enabling flexible MBH wavelength planning that is not restricted by ITU-T grid requirements. An optical amplifier is used to compensate for passive coupler, SSMF, and 1:N passive splitter losses, enabling a total of 4N SD ONUs per feeder fiber. At each SD ONU, the resource/service assignment decisions made by the OLT-side global SD controller are simply communicated by the ONU-side local SD interface protocol to the SD drivers, which configure the underlying optical/electronic hardware elements, starting with the tunable optical filter (TOF), which is exploited for SD wavelength selection. Following photodetection, a 1×2 SD switch in the form of an input/output (I/O) path selector is used to discriminate between MBH traffic types. In the case of OFDMA MBH, for example, the 1×2 SD switch will activate I/O pin assignments between the PD and ADC, while an SD I/O connection between the PD and the CPRI MBH Rx will be formed otherwise. (SD I/O connections would also enable upstream operation, not shown in FIG. 6 due to space constraints.) Finally a 2×1 SD switch is used to select a single output path to the RF front-end for wireless signal transmission.

Figure 6B:
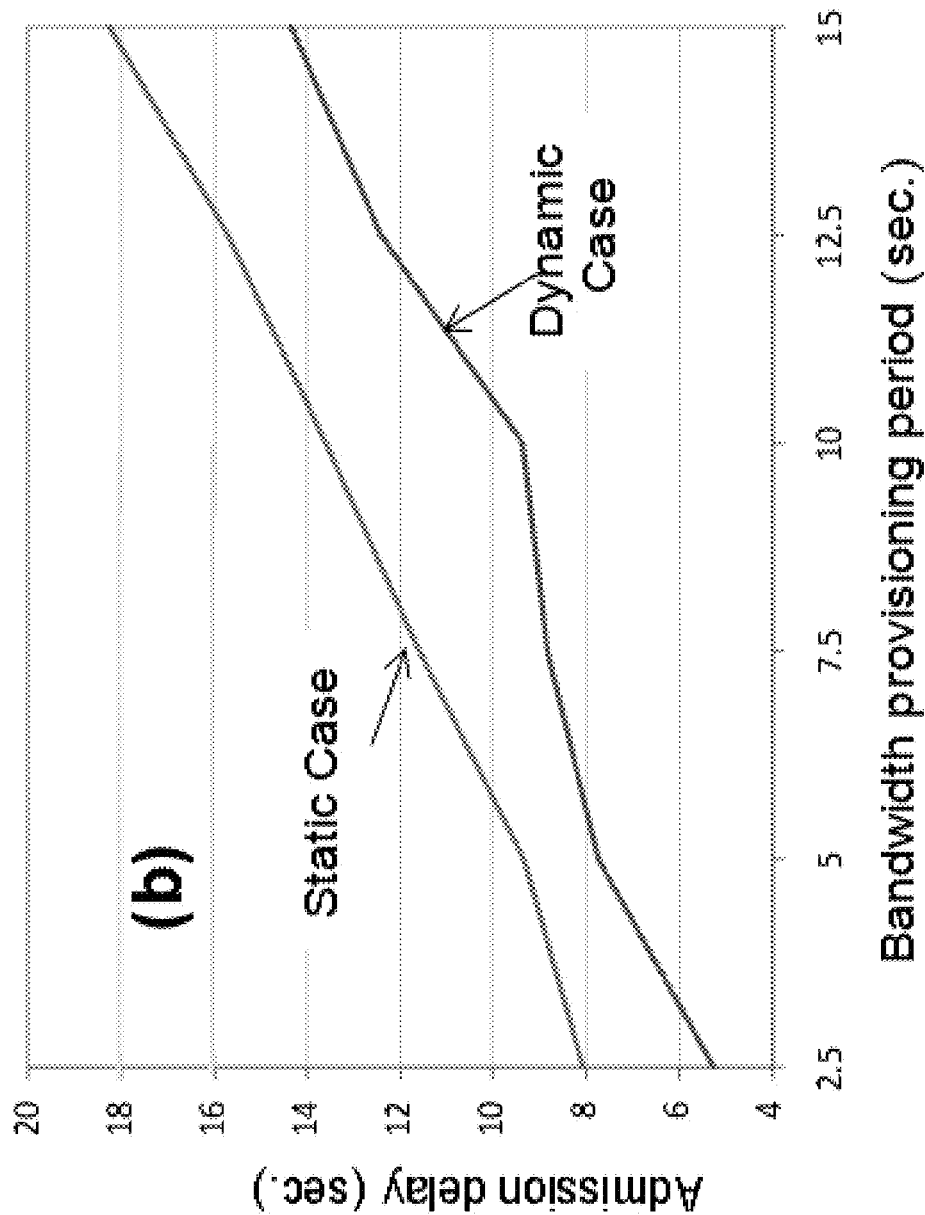
FIG. 6(b) depicts delay in the proposed SD heterogeneous MBH architecture in FIG. 6(a).
Figure 6C:
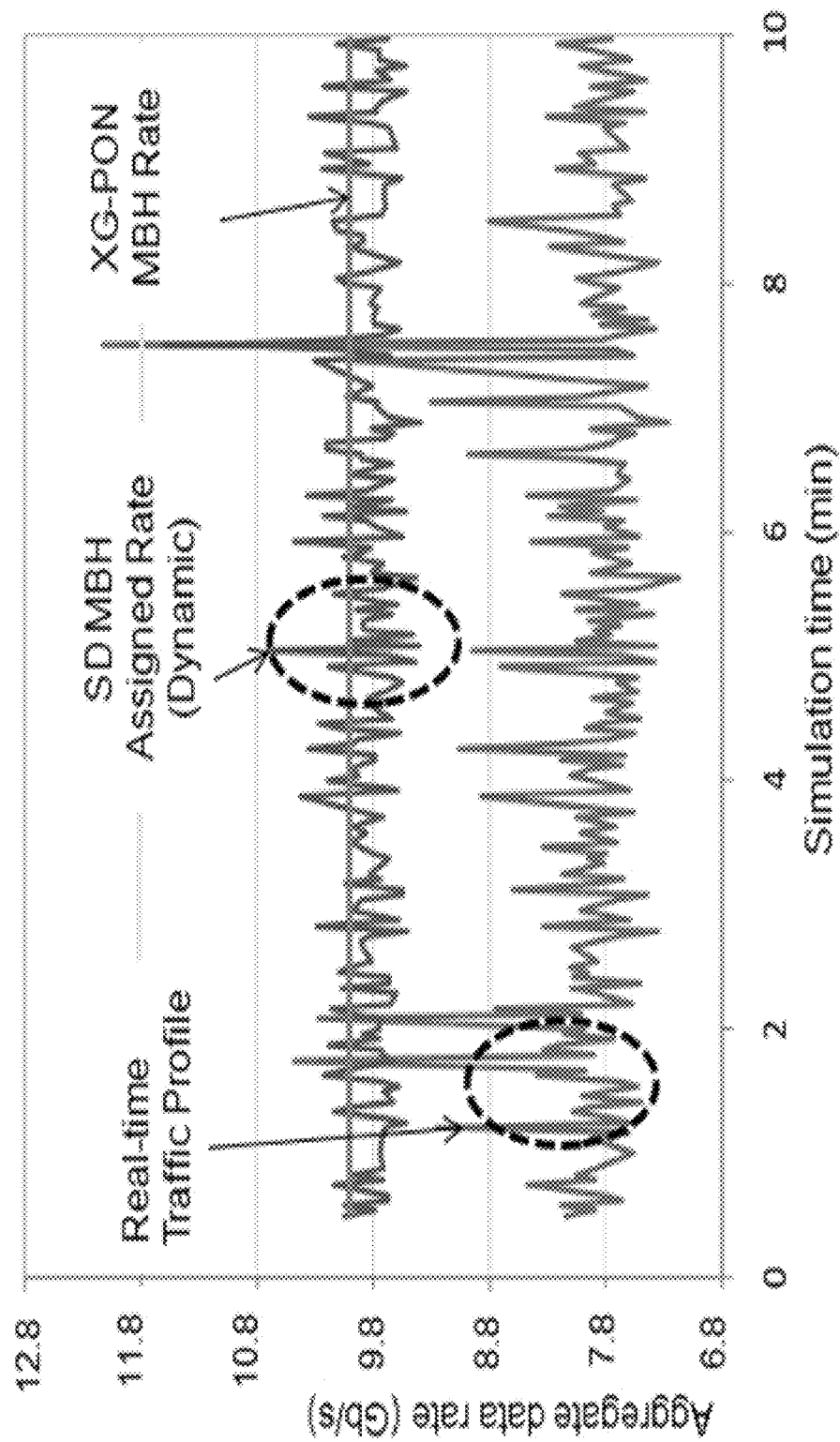
FIG. 6(c) depicts throughput in the proposed SD heterogeneous MBH architecture in FIG. 6(a).

To evaluate the proposed SD heterogeneous MBH approach, a custom real-time traffic simulation with self-similar traffic (H=0.8), 1 Gb/s peak per-ONU rates (as per LTE-A), and over-provisioning factor δ=1.5, was built and executed in OPNET Modeler, comparing SD MBH throughput/delay with global SD resource/service control implemented by the Meta-MAC [3], versus performance of non-SD MBH using XG-PON only. As shown in FIG. 6(c), fixed XG-PON MBH (static 7.3 Gb/s rate) could not adapt to real-time traffic variations or exploit statistical multiplexing, resulting in either bandwidth waste or insufficiency. The SD approach, however, closely followed the real-time traffic profile, delivering variable bandwidth as needed (dynamic 8.2 Gb/s peak in FIG. 6(c)). With the dynamic SD approach, the delay in accommodating new traffic requests was also reduced by 17-35%, depending on the frequency of SD dynamic resource provisioning, as shown in FIG. 6(b).

III. EXPERIMENTAL SETUP AND RESULTS

Figure 7:
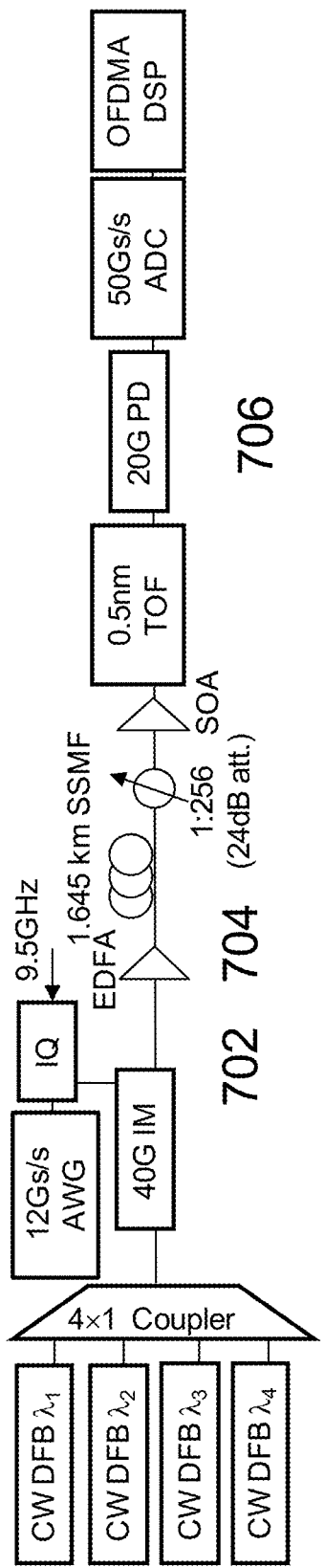
FIG. 7 depicts an experimental setup.
Figure 8A:
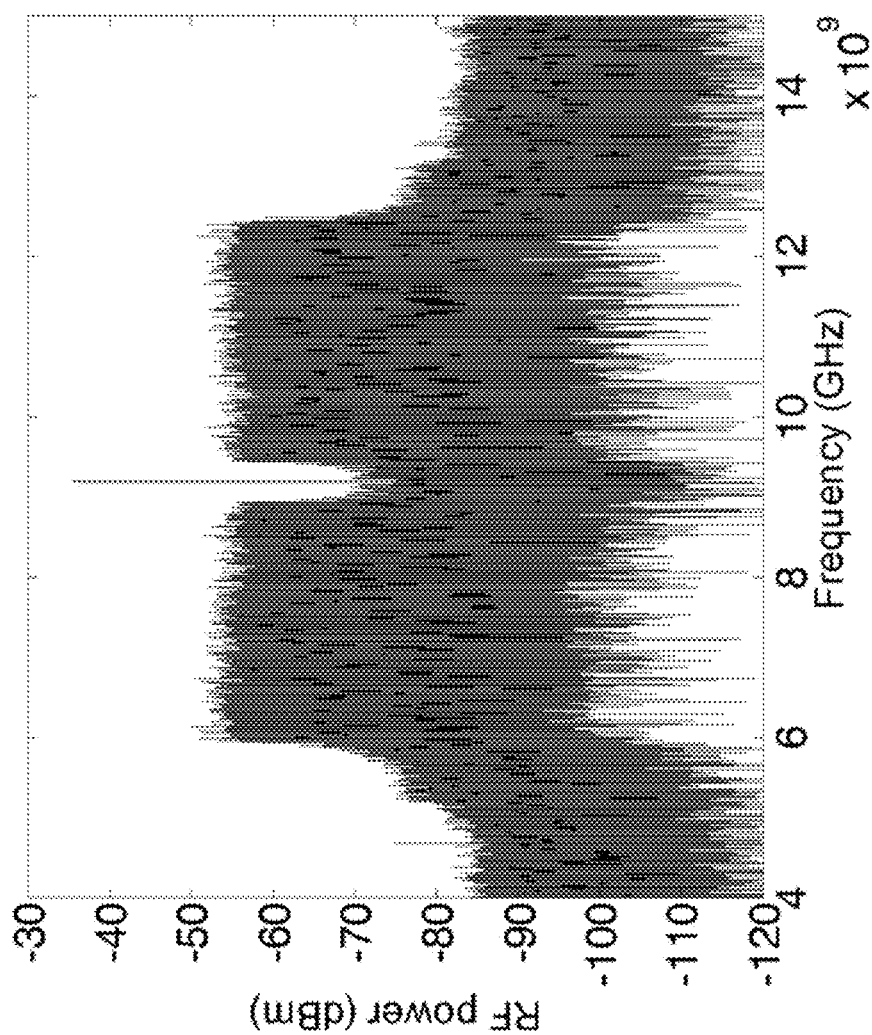
FIGS. 8(a)-(c) depict representative signal spectra shown at 0.01 nm resolution for positions 702, 704, and 706 in FIG. 7, respectively.
Figure 8B:
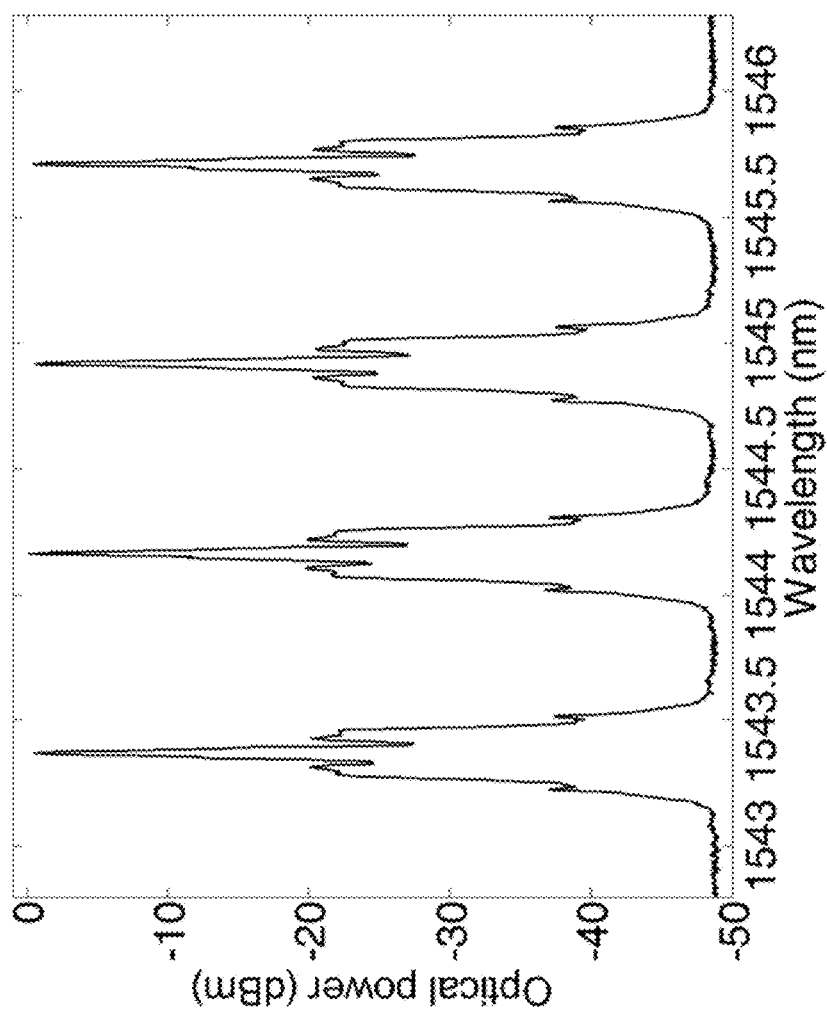
Figure 8C:
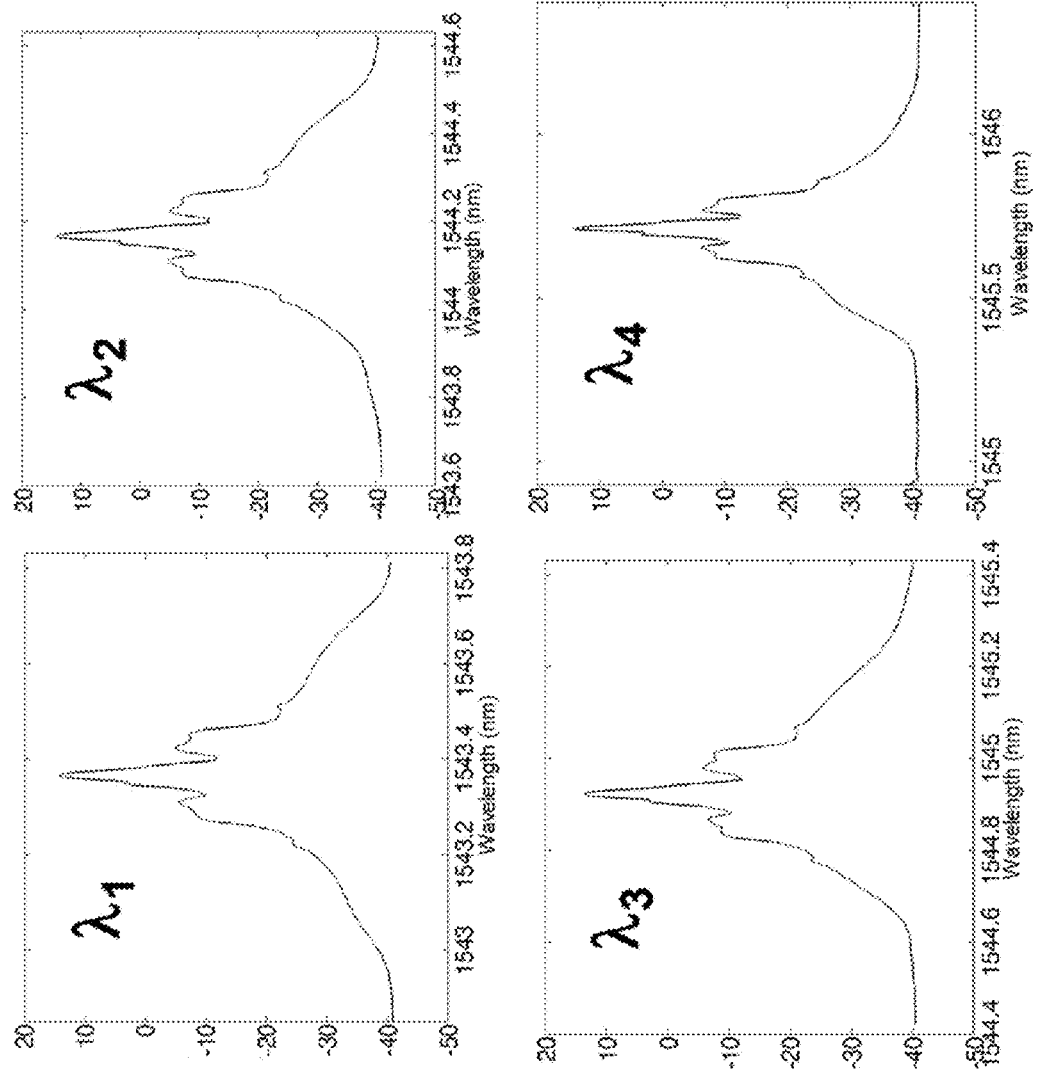
Figure 8D:
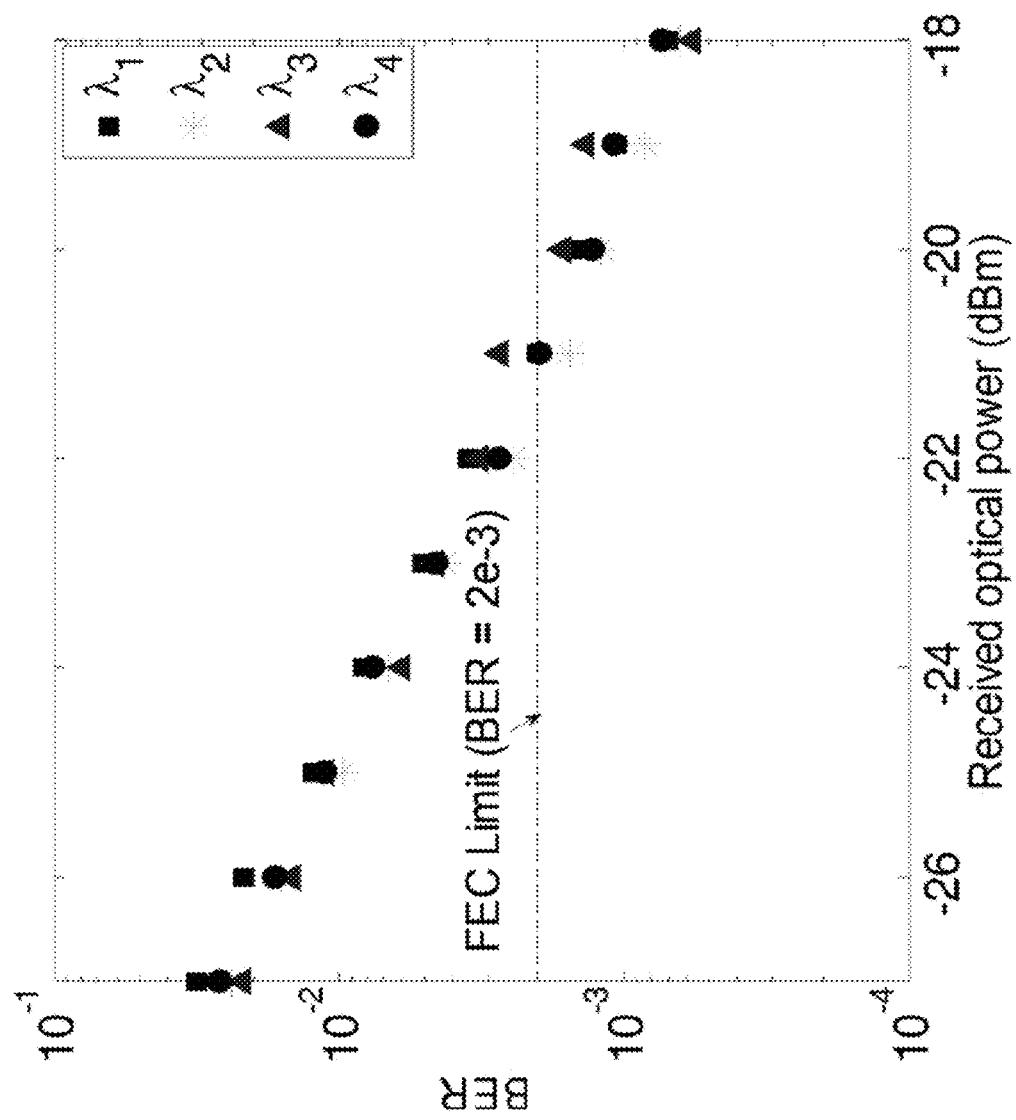
FIG. 8(d) depicts bit error rate (BER) results.

FIG. 7 shows the experimental setup, and FIGS. 8(a)-(c) show representative signal spectra for positions 702, 704, and 706 in FIG. 7, respectively. Four CW DFB laser signals ($\lambda_1$=1543.34 nm, $\lambda_2$=1544.14 nm, $\lambda_3$=1544.94 nm, $\lambda_4$=1545.74 nm) were combined with a 4×1 optical coupler, and input to a 40 GHz IM biased at quadrature. To test the most challenging physical-layer MBH scenario, all four CW carriers were modulated by a 25.125 Gb/s/λ OFDMA signal rather than an OOK signal at a CPRI-specified lower rate [8]. The OFDMA signal (FFT size 256, 134 active subcarriers, 16-QAM symbol mapping, 10.8% overhead, 562.5 MHz center guard-band) was generated offline, output continuously by a 12 Gs/s AWG and RF up-converted to 9.5 GHz. The aggregate 100.5 Gb/s WDM-OFDMA signal was amplified with an EDFA and transmitted at 3.7 dBm/λ launch power over 1.645 km SSMF (last-mile backhaul scenario) followed by a 1:256 passive split (24 dB extra attenuation.) With support for 256 ONUs/λ, the four-λ architecture enables 1024 total ONUs per feeder fiber. Following a commercial SOA (25 dB gain, 7.2 dB noise figure), a 0.5 nm TOF was used to select the target wavelength prior to photodetection with a 20 GHz PD. Digitization of the received signal was done with a 50 GS/s real-time oscilloscope, with the post-detection processing performed off-line based on 0.25M measured bits per BER point. FIG. 8(d) plots the experimental BER results for the 100.5 Gb/s tunable WDM-OFDMA-PON setup, confirming that a minimum BER differential between the four wavelengths, such that the FEC limit (BER=$2 \times 10^{-3}$) was achieved with −20 dBm received power for all channels. A worst-case 24 dB power budget was thus confirmed for the proposed 100.5 Gb/s MBH architecture.

IV. CONCLUSIONS

We have presented the first software-defined heterogeneous MBH architecture featuring generic, software-reconfigurable OLT/ONU transceivers capable of operating in different MBH modes (e.g. CPRI vs. OFDMA MBH), as needed. Throughput and delay benefits of the approach were confirmed through a real-time traffic simulation, while a 100 Gb/s aggregate rate with 1024 per-fiber cell counts was experimentally demonstrated with a tunable WDM-OFDMA-PON setup. The approach is thus attractive for high-performance, software-reconfigurable MBH service convergence.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A software-defined (SD) optical network unit (ONU), comprising:
   a local software-defined (SD) controller;
   one or more software-defined (SD) optical network unit (ONU) drivers physically connected to the local SD controller;
   an underlying hardware component physically connected to each of said one or more SD ONU drivers;
   a passive splitter;
   a tunable optical filter (TOF);
   a photo diode (PD); and
   a first software-defined (SD) switch,
   wherein the local SD controller manages said one or more SD ONU drivers by issuing commands communicated to said one or more SD ONU drivers,
   wherein each of said one or more SD ONU drivers implements a required function on the underlying hardware component,
   wherein said one or more SD ONU drivers comprise a first SD ONU driver and a second ONU driver, the TOF is physically connected to the first SD ONU driver, and the first SD switch is physically connected to the second SD ONU driver,
   wherein the TOF receives an output optical signal from the passive splitter,
   wherein the PD receives an output optical signal from the TOF,
   wherein the first SD switch receives an output electrical signal from the PD, and selects one of possible output paths,
   wherein said one or more SD ONU drivers further comprise a third software-defined (SD) optical network unit (ONU) driver,
   wherein the possible output paths include:
      an analog-to-digital converter (ADC);
      an orthogonal frequency division multiple access (OFDMA) digital signal processor (DSP);
      a second software-defined (SD) switch physically connected to the third SD ONU driver; and
      a radio frequency (RF) antenna,
   wherein the ADC receives an output signal from the first SD switch,
   wherein the OFDMA DSP receives an output signal from the ADC,
   wherein the second SD switch receives an output signal from the OFDMA DSP, and
   wherein the RF antenna receives an output signal from the second SD switch.

2. The SD ONU as in claim 1,
   wherein the possible output paths include:
      a time division multiple access (TDMA) receiver, and
   wherein the TDMA receiver receives an output signal from the second SD switch.

3. The SD ONU as in claim 1,
   wherein the local SD controller communicates with said one or more SD ONU drivers through an Openflow interface to configure the underlying hardware component in accordance with a service or resource management target set by a global software-defined (SD) controller.

4. A software-defined (SD) optical network unit (ONU), comprising:
   a local software-defined (SD) controller;
   one or more software-defined (SD) optical network unit (ONU) drivers physically connected to the local SD controller;
   an underlying hardware component physically connected to each of said one or more SD ONU drivers;
   a passive splitter;
   a tunable optical filter (TOF);
   a photo diode (PD); and
   a first software-defined (SD) switch,
   wherein the local SD controller manages said one or more SD ONU drivers by issuing commands communicated to said one or more SD ONU drivers,
   wherein each of said one or more SD ONU drivers implements a required function on the underlying hardware component,
   wherein said one or more SD ONU drivers comprise a first SD ONU driver and a second ONU driver, the TOF is physically connected to the first SD ONU driver, and the first SD switch is physically connected to the second SD ONU driver, wherein the TOF receives an output optical signal from the passive splitter, wherein the PD receives an output optical signal from the TOF, wherein the first SD switch receives an output electrical signal from the PD, and selects one of possible output paths, wherein said one or more SD ONU drivers further comprise a third software-defined (SD) optical network unit (ONU) driver, wherein the possible output paths includes:
- an digital-to-analog converter (DAC);
- a common public radio interface (CPRI) digital signal processor (DSP);
- a second software-defined (SD) switch physically connected to the third SD ONU driver; and
- a radio frequency (RF) antenna, wherein the CPRI DSP receives an output signal from the first SD switch, wherein the DAC receives an output signal from the CPRI DSP, wherein the second SD switch receives an output signal from the DAC, and wherein the RF antenna receives an output signal from the second SD switch.

\* \* \* \* \*